No. 679,913. Patented Aug. 6, 1901.
C. R. REID.
CLIP FOR BICYCLE SADDLES.
(Application filed May 11, 1900.)
(No Model.)
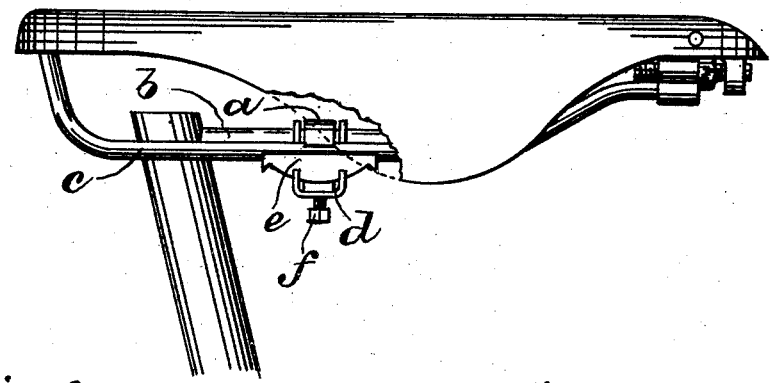
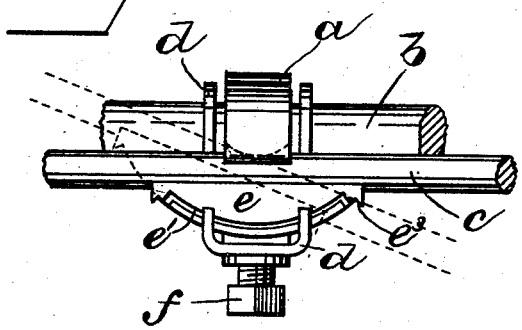
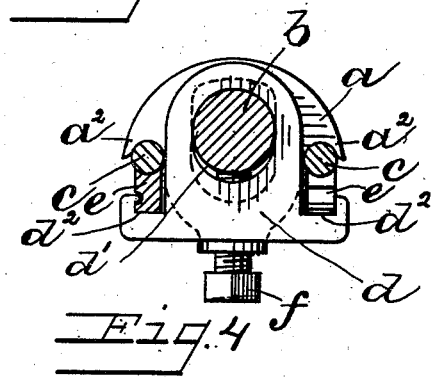
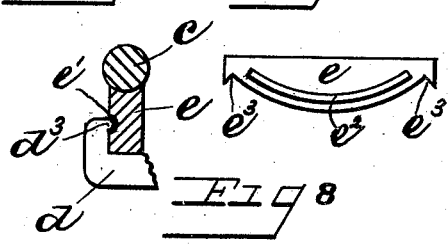
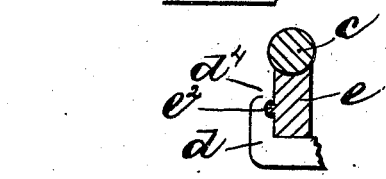
Witnesses
Frank L. Walker
Chas. I. Welch
Inventor
Chas. R. Reid
By his Attorney

UNITED STATES PATENT OFFICE.

CHARLES R. REID, OF SPRINGFIELD, OHIO, ASSIGNOR TO THE KIRK-PATRICK SADDLE COMPANY, OF SAME PLACE.

CLIP FOR BICYCLE-SADDLES.

SPECIFICATION forming part of Letters Patent No. 679,913, dated August 6, 1901.

Application filed May 11, 1900. Serial No. 16,311. (No model.)

*To all whom it may concern:*

Be it known that I, CHARLES R. REID, a citizen of the United States, residing at Springfield, in the county of Clark and State of Ohio, have invented certain new and useful Improvements in Clips for Bicycle-Saddles, of which the following is a specification.

My invention relates to improvements in bicycles, and more especially to clips for attaching saddles to the same.

The object of my invention is to provide a clip of the most perfect construction at the least possible cost that can be easily adjusted to suit the convenience of the rider. I attain this object by the constructions and combinations of parts hereinafter described, and shown in the accompanying drawings, in which—

Figure 1 is a side elevation of seat-post with arm and saddle of a bicycle, the saddle being partially cut away, showing the arrangement of the clip. Fig. 2 is a side elevation of the clip attached to the seat-post arm. Fig. 3 is an end view of same. Fig. 4 is an end view of the T-shaped part and also shows a small detail sectional view looking in the direction indicated by the arrows. Fig. 5 is a top view of the U-shaped part. Fig. 6 is a side view of the adjusting segmental bars, illustrating a modification similarly to Fig. 8. Fig. 7 is an end view of the adjusting segmental bars, showing a groove in same in which projections on the U-shaped part operate; and Fig. 8 is a modification showing an end view of the adjusting segmental bars with a flange on same working in grooves in the U-shaped part.

Like parts are represented by similar letters of reference in the several views.

In the construction of my device I employ a T-shaped part $a$, with an oblong opening $a'$ through the side loosely surrounding the seat-post arm $b$ and with hook-bearings $a^2$ upon each side thereof to contact one side of the saddle-frame supports $c$. There is also a U-shaped part $d$, adapted to receive the T-shaped part, with an opening $d'$ through its sides to loosely encircle the seat-post arm $b$ and is provided with recessed bearings $d^2$ on each side thereof, adapted to receive the segmental bars $e$, which are interposed between the same and the frame-supports $c$, the straight edge of said bars contacting the frame-supports on the side opposite to which the hook-bearings $a^2$ of the T-shaped part contact and the longitudinally-rounded edges of said bars resting in the recessed bearings $d^2$ of the U-shaped part. Said recessed bearings and segmental bars are preferably provided with intermeshing or interengaging parts, such as the projections $d^3$ on said recessed bearings, to engage the groove $e'$ in the segmental bars, as shown in Figs. 2 and 7, or by providing said bars with a flange $e^2$ to engage the grooves $d^4$ of said recessed bearings, as shown in Figs. 6 and 8. The said segmental bars are also provided with the stops $e^3$ at their outer ends to limit their adjustment. An opening $d^5$ in the bottom of the U-shaped part permits the lower portion of the T-shaped part to extend through the same. A set-screw $f$ is provided in said lower portion of the T-shaped part, which contacts at its inner end with the seat-post arm $b$, and is the means whereby the clip is tightened to the saddle-frame supports and the seat-post arm. The U-shaped part is hung upon the seat-post arm and supports the segmental bars; but the T-shaped part does not touch said arm, the clamping action being secured by the U-shaped part contacting or hanging upon one side of said arm and the operation of the set-screw in the T-shaped part against the opposite side of said arm, whereby the U and T shaped parts are drawn toward each other, and the saddle-supports and segmental bars being interposed between said parts are thereby clamped and secured to the seat-post arm.

It will be seen that when the set-screw is loose the segmental bars may be turned on their longitudinally-rounded edges, so as to adjust the saddle longitudinally and vertically, the limit of the angle of adjustment in one direction being shown by the dotted lines in Fig. 2. To provide a better bearing when there is an extreme adjustment in either direction, the hook-bearings $a^2$ of the T-shaped part are rounded laterally, as shown at $a^3$ in small detail of Fig. 4.

When adjusted to suit the convenience of the rider, the set-screw in the T-shaped part is tightened against the seat-post arm, thereby tightening the frame-supports between the hook-bearings of said T-shaped part and the segmental bars, and said bars resting in the recessed bearings of the U-shaped part it by the same movement is tightened on the seat-post arm, and thus the clip is firmly attached to both the frame-supports and the seat-post arm, the openings $a'$ and $d'$ through the sides of the T and U shaped parts for the seat-post arm being of proper size to admit of a sufficient movement of the parts.

Having thus described my invention, I claim—

1. In a clip for bicycle-saddles, the combination with the seat-post arm and frame-supports of the saddle, of adjustable tipping-bars segmental on one edge and straight on the opposite edge, the straight edge to contact with the straight portions of said frame-supports, a clamping device engaging said bars and supports and means to operate said clamp and to tighten the same on said seat-post arm, substantially as specified.

2. In a clip for bicycle-saddles, the combination of segmental tipping-bars, straight longitudinally on one edge to conform to and contact with the frame-supports of said saddle and rounded longitudinally, in a single curve, on the opposite edge, a clamp, the bearings of one side adapted to engage said frame-supports on the side opposite said bars and the bearings of the other side thereof adapted to engage said longitudinally-rounded edge of said bars for the purpose of tipping and adjusting the saddle and means to operate said clamps and to tighten the same on the seat-post arm of said saddle, substantially as specified.

3. In a clip for bicycle-saddles, the combination of segmental bars having longitudinally-rounded edges and straight edges, the straight edges contacting the frame-supports of said saddle, a clamp consisting of a T and U shaped part, one extending through the other, with openings through the sides thereof for the seat-post arm of sufficient size to permit a movement of said parts at right angles to said arm, the U-shaped part adapted to engage the longitudinally-rounded edge of said bars and the seat-post arm and the T-shaped part adapted to engage said frame-supports on the side opposite said bars and a set-screw working through said T-shaped part against the seat-post arm to operate the clamp and to tighten it on the seat-post arm of the saddle, substantially as specified.

In testimony whereof I have hereunto set my hand this 4th day of May, A. D. 1900.

CHARLES R. REID.

Witnesses:
CHAS. I. WELCH,
EDMOND J. OGDEN.